(12) United States Patent
Horiguchi

(10) Patent No.: US 8,081,727 B2
(45) Date of Patent: Dec. 20, 2011

(54) RADIO COMMUNICATION APPARATUS AND SYSTEM

(75) Inventor: Tomoya Horiguchi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 916 days.

(21) Appl. No.: 12/104,543

(22) Filed: Apr. 17, 2008

(65) Prior Publication Data

US 2008/0260084 A1  Oct. 23, 2008

(30) Foreign Application Priority Data

Apr. 20, 2007 (JP) ................................ 2007-112255

(51) Int. Cl.
*H04L 7/06* (2006.01)
(52) U.S. Cl. ........ 375/364; 375/359; 375/296; 375/356; 455/67.13
(58) Field of Classification Search .................. 375/364, 375/359, 296, 356; 455/67.13
See application file for complete search history.

(56) References Cited

U.S. PATENT DOCUMENTS

| | | | |
|---|---|---|---|
| 6,999,723 B2* | 2/2006 | Kusbel et al. ................ | 455/63.1 |
| 2002/0155811 A1* | 10/2002 | Prismantas et al. ............ | 455/63 |
| 2003/0045282 A1* | 3/2003 | Yamaguchi et al. .......... | 455/424 |
| 2003/0203721 A1* | 10/2003 | Berezdivin et al. ........... | 455/126 |
| 2007/0254599 A1* | 11/2007 | O'Keeffe et al. .............. | 455/75 |
| 2008/0137787 A1* | 6/2008 | Soffer .......................... | 375/346 |

FOREIGN PATENT DOCUMENTS

| JP | 9-289527 | 11/1997 |
|---|---|---|
| JP | 2006-191315 | 7/2006 |

OTHER PUBLICATIONS

Murakami, T. et al., "Interference potential of PC noise on MB-OFDM UWB systems", Dec. 2006, IEEE Communication Letters, vol. 10, p. 804-806.*

* cited by examiner

*Primary Examiner* — Shuwang Liu
*Assistant Examiner* — Sung Ahn
(74) *Attorney, Agent, or Firm* — Ohlandt, Greeley, Ruggiero & Perle, L.L.P.

(57) ABSTRACT

A radio communication apparatus connected to a device including a digital signal processing unit generating a clock signal, the apparatus includes an acquisition unit acquiring frequency information concerning the clock signal from the digital signal processing unit, a first measurement unit measuring a signal power in a first frequency band, a comparison unit comparing the signal power with a threshold, a first selection unit selecting, from the first frequency band, a second frequency band necessary for data communication, a bandwidth of the first frequency band whose signal power is lower than the threshold being more than a bandwidth of the second frequency band, a second selection unit selecting an optimum communication scheme from a plurality of communication schemes of the data communication according to the frequency information, and a communication unit using the optimum communication scheme to perform the data communication in the second frequency band.

6 Claims, 8 Drawing Sheets

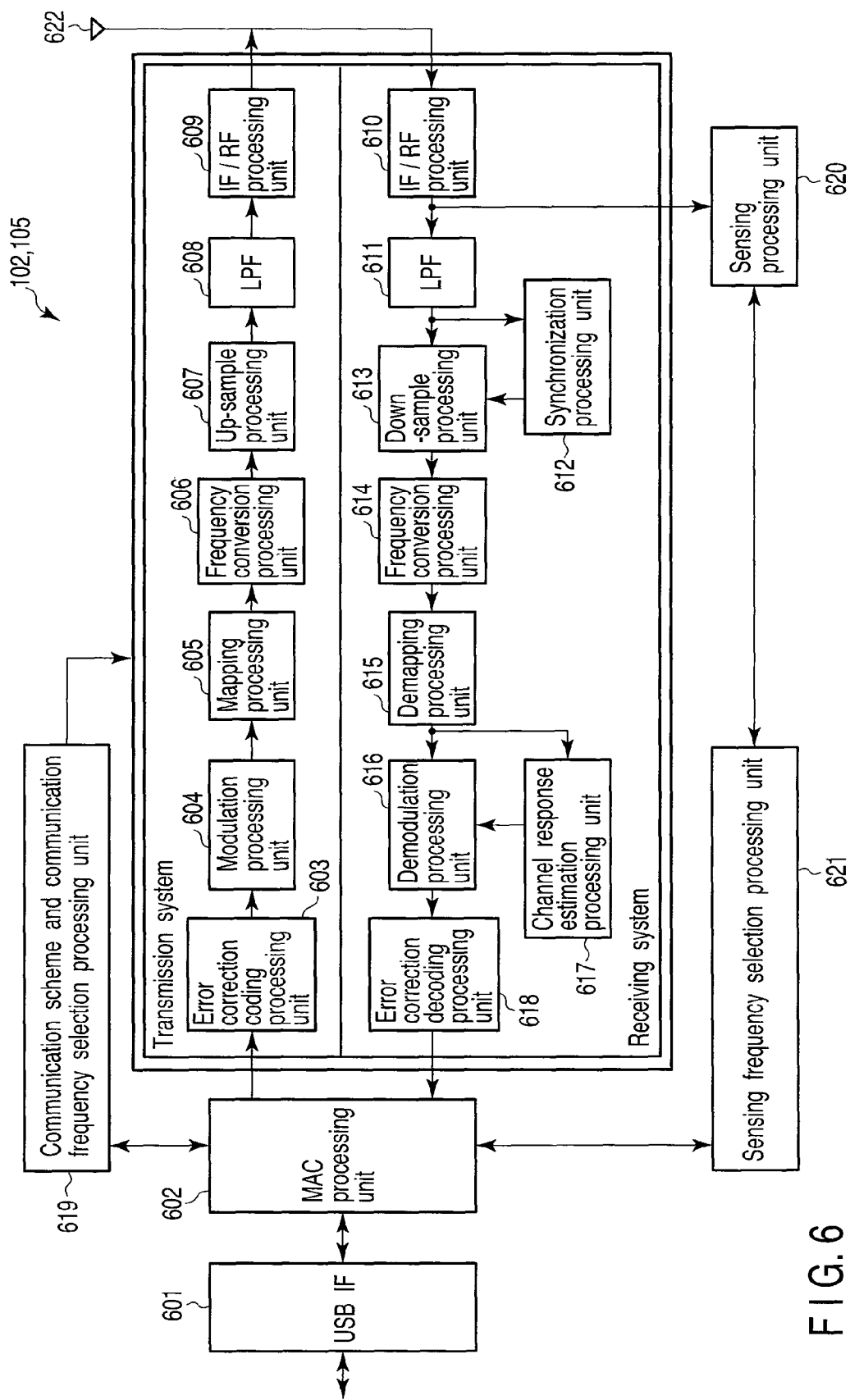
F I G. 6

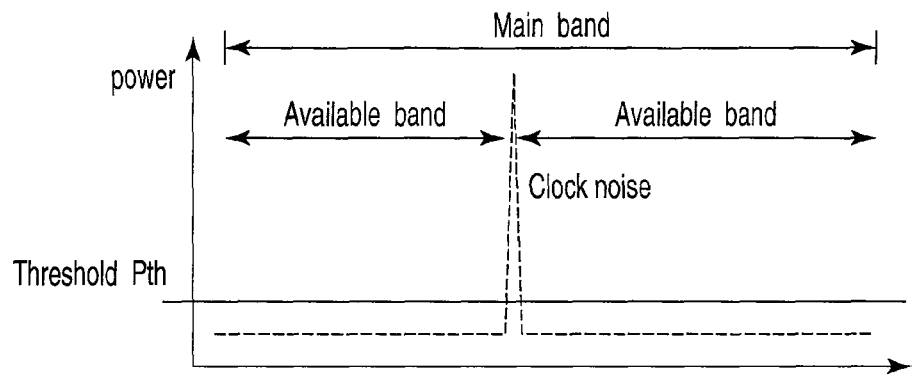
F I G. 8
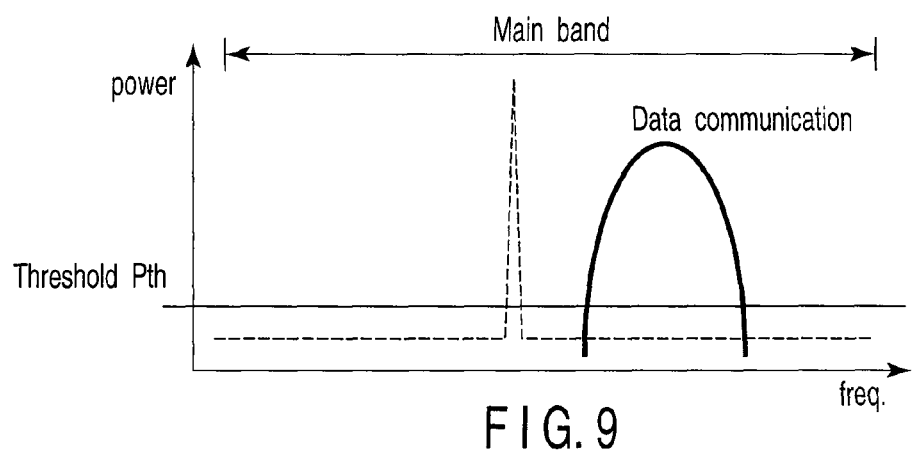
F I G. 9
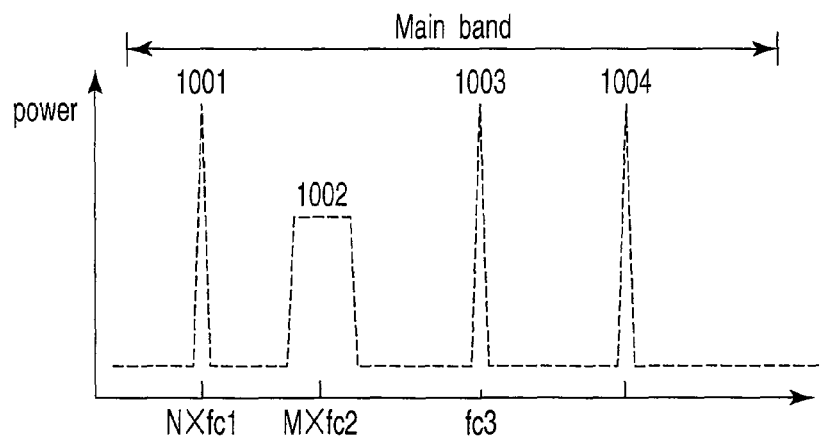
F I G. 10

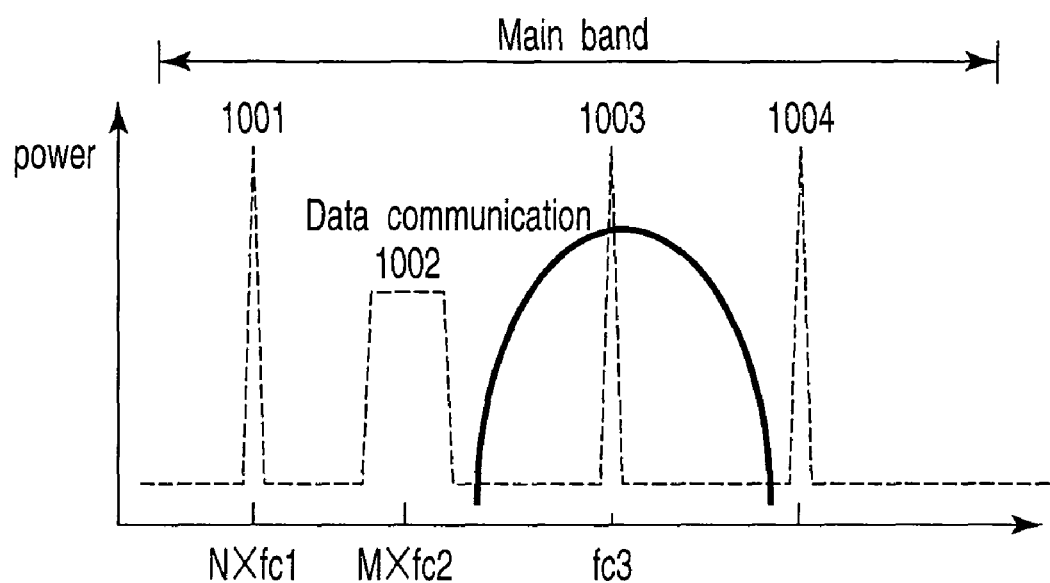
F I G. 11
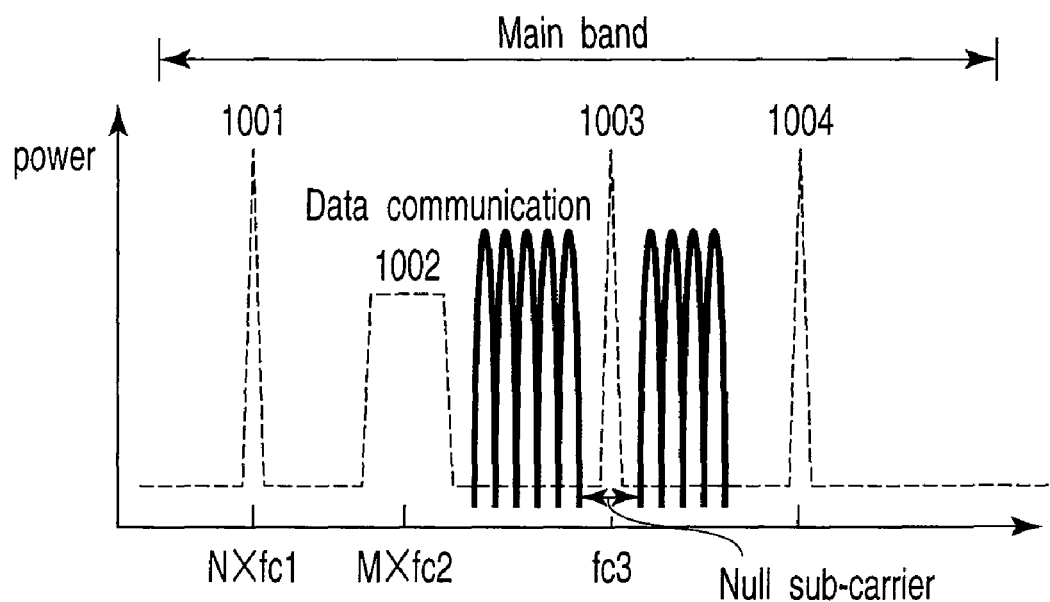
F I G. 12

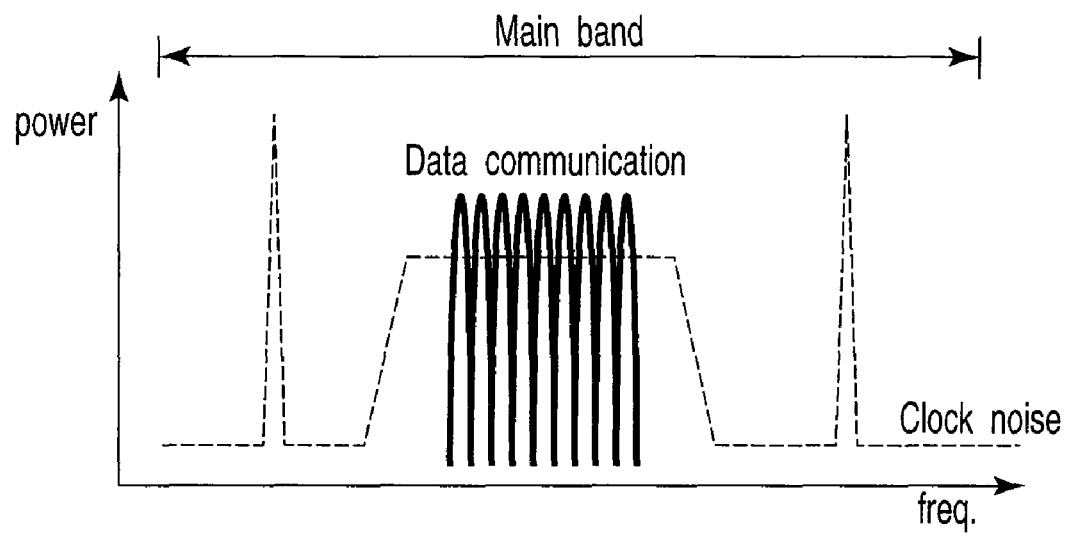
F I G. 1 3
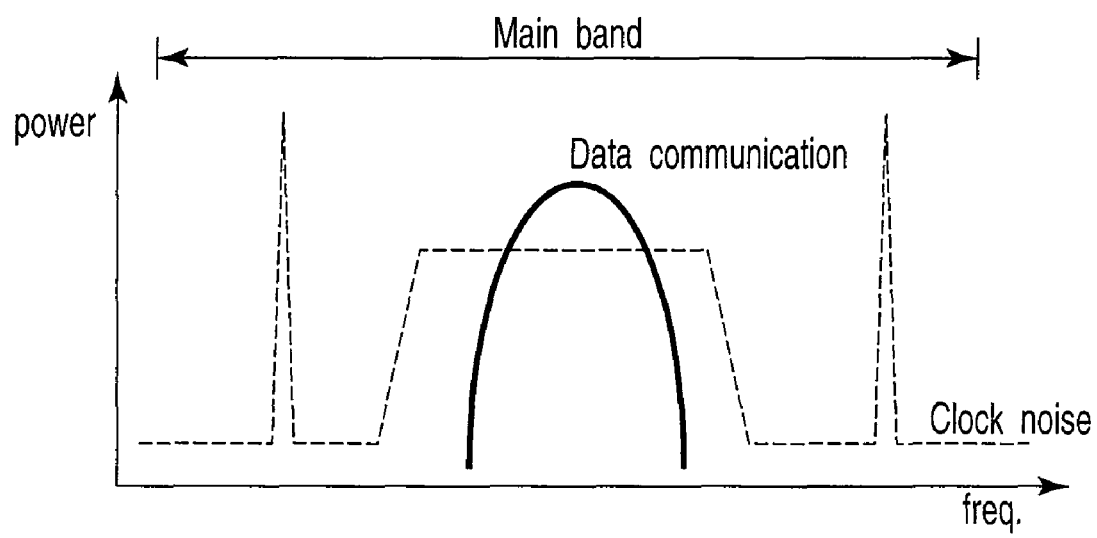
F I G. 1 4

RADIO COMMUNICATION APPARATUS AND SYSTEM

CROSS-REFERENCE TO RELATED APPLICATIONS

This application is based upon and claims the benefit of priority from prior Japanese Patent Application No. 2007-112255, filed Apr. 20, 2007, the entire contents of which are incorporated herein by reference.

BACKGROUND OF THE INVENTION

1. Field of the Invention

The present invention relates to radio communication apparatus and system involved in a cognitive radio communication system in which a communication scheme is changed according to an environment.

2. Description of the Related Art

Conventionally, in order to solve a problem that receiving performance of the radio communication apparatus is decreased due to a noise generated by a digital signal processing unit included in the radio communication apparatus, for example, JP-A 2006-191315 (KOKAI) discloses a technique in which a clock frequency supplied in digital signal processing is changed such that the noise generated by the digital signal processing device does not overlap a receiving frequency of the radio communication, and JP-A H9-289527 (KOKAI) discloses a technique in which the clock frequency is temporally changed to perform FM modulation to a clock signal, thereby suppressing an interference signal generated by spread.

However, the noise generated by digital signal processing unit or electronic device is frequently observed in a frequency band used in the communication. Recently, frequency resources have become tight because various kinds of communication are performed. Therefore, the clock is hardly changed in the digital signal processing so as to avoid all the bands used in the communication. Additionally, from the standpoints of circuit scale and cost, it is impractical that a circuit (such as PLL and a control circuit) for changing the clock frequency of the digital signal processing is mounted on all the digital signal processing circuits in introducing the above-described conventional techniques.

BRIEF SUMMARY OF THE INVENTION

In accordance with an aspect of the invention, there is provided a radio communication apparatus connected to a device including a digital signal processing unit generating a clock signal, the apparatus comprising: an acquisition unit configured to acquire frequency information concerning the clock signal from the digital signal processing unit; a first measurement unit configured to measure a signal power in a first frequency band; a comparison unit configured to compare the signal power with a threshold; a first selection unit configured to select, from the first frequency band, a second frequency band necessary for data communication, a bandwidth of the first frequency band whose signal power is lower than the threshold being more than a bandwidth of the second frequency band; a second selection unit configured to select an optimum communication scheme from a plurality of communication schemes of the data communication according to the frequency information; and a communication unit configured to use the optimum communication scheme to perform the data communication in the second frequency band.

In accordance with an another aspect of the invention, there is provided a radio communication system comprising a first radio communication apparatus connected to a first device including a first digital signal processing unit generating a first clock signal and a second radio communication apparatus connected to a second device including a second digital signal processing unit generating a second clock signal, the first radio communication apparatus comprising: an acquisition unit configured to acquire first frequency information on the first clock signal; a first measurement unit configured to measure a first signal power in a first frequency band; a first comparison unit configured to compare the first signal power with a first threshold; a first determination unit configured to determine that data communication be started when a bandwidth of a second frequency band whose first signal power is lower than the first threshold is more than a bandwidth of a frequency band necessary for the data communication; and a first transmission unit configured to transmit a communication request signal to the second radio communication apparatus to start the data communication, the second radio communication apparatus comprising: a first receiving unit configured to receive the communication request signal; and a second transmission unit configured to transmit a response signal corresponding to the communication request signal, the first radio communication apparatus further comprising: a first selection unit configured to select, from the second frequency band, a third frequency band necessary for data communication; a second selection unit configured to select an optimum communication scheme from a plurality of communication schemes of the data communication according to the first frequency information; and a third transmission unit configured to transmit first information including the third frequency band and the optimum communication scheme to the second radio communication apparatus, the second radio communication apparatus further comprising: a second receiving unit configured to receive the first information; a second measurement configured to measure a second signal power in the third frequency band; a second comparison unit configured to compare the second signal power with a second threshold; a second determination unit configured to determine that the data communication is performed while the third frequency band and the optimum communication scheme are set to a determined frequency band and a determined communication scheme respectively, when the second signal power is lower than the second threshold in the third frequency band; and a fourth transmission unit configured to transmit second information including the determined frequency band and the determined communication scheme to the first radio communication apparatus, the first radio communication apparatus further comprising: a third receiving unit configured to receive the second information; and a first start unit configured to start communication with the second radio communication apparatus by the determined frequency band and the determined communication scheme, and the second radio communication apparatus further comprising a second start unit configured to start communication with the first radio communication apparatus by the determined frequency band and the determined communication scheme.

BRIEF DESCRIPTION OF THE SEVERAL VIEWS OF THE DRAWING

FIG. 6 is a block diagram showing a radio communication module of FIG. 1;

FIG. 8 is a frequency-power chart showing an example of result in Step S701 of FIG. 7;

FIG. 9 is a frequency-power chart showing an example of result in Step S703 of FIG. 7;

FIG. 10 is a frequency-power chart showing an example in the case where result in Step S702 of FIG. 7 is affirmative;

FIG. 11 is a frequency-power chart showing an example of result in Step S708 of FIG. 7;

FIG. 12 is a frequency-power chart showing an example of result in Step S710 of FIG. 7;

FIG. 13 is a frequency-power chart showing an example of result in Step S712 of FIG. 7; and FIG. 14 is a frequency-power chart showing an example of result in Step S713 of FIG. 7.

DETAILED DESCRIPTION OF THE INVENTION

Figure 1:
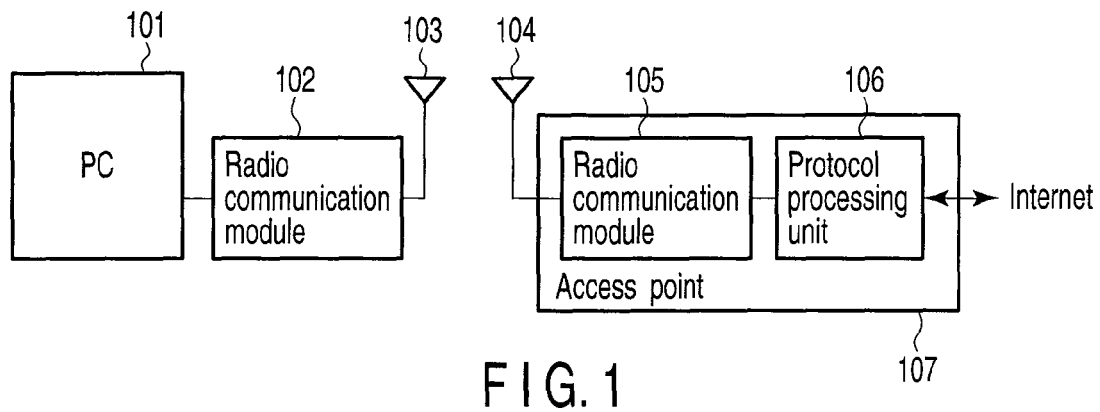
FIG. 1 is a block diagram showing a radio communication system according to an embodiment.

Radio communication apparatus and system according to an exemplary embodiment of the invention will be described below with reference to the drawings. In the following embodiments, the same operation is performed in a component designated by the same numeral, and the description is omitted.

A radio communication system according to an embodiment will be described with reference to FIG. 1.

The radio communication system of the embodiment includes a radio communication apparatus having Personal Computer (PC) 101, a radio communication module 102, and an antenna 103 and a radio communication apparatus having an antenna 104, a radio communication module 105, and a protocol processing unit 106. The radio communication module 105 and the protocol processing unit 106 are referred to as an access point 107.

The radio communication module 102 is connected to PC 101 through an interface such as a Peripheral Component Interconnect (PCI) bus and Universal Serial Bus (USB). Alternatively, using a dedicated interface in LSI which is a component in a communication device such as the access point 107, the radio communication module 102 may be connected to the protocol processing unit 106. The radio communication modules 102 and 105 select a center frequency and a communication scheme suitable to the communication in response to a communication request from PC 101 or the protocol processing unit 106, and the radio communication modules 102 and 105 perform communication through the antenna 103 and 104 using the selected center frequency and communication scheme.

In the configuration of FIG. 1, the radio communication module 102 possibly receives a noise signal generated by a clock of PC 101 through the antenna 103. Similarly, the radio communication module 105 possibly receives a noise signal generated by a clock of the protocol processing unit 106 through the antenna 104.

Figure 2:
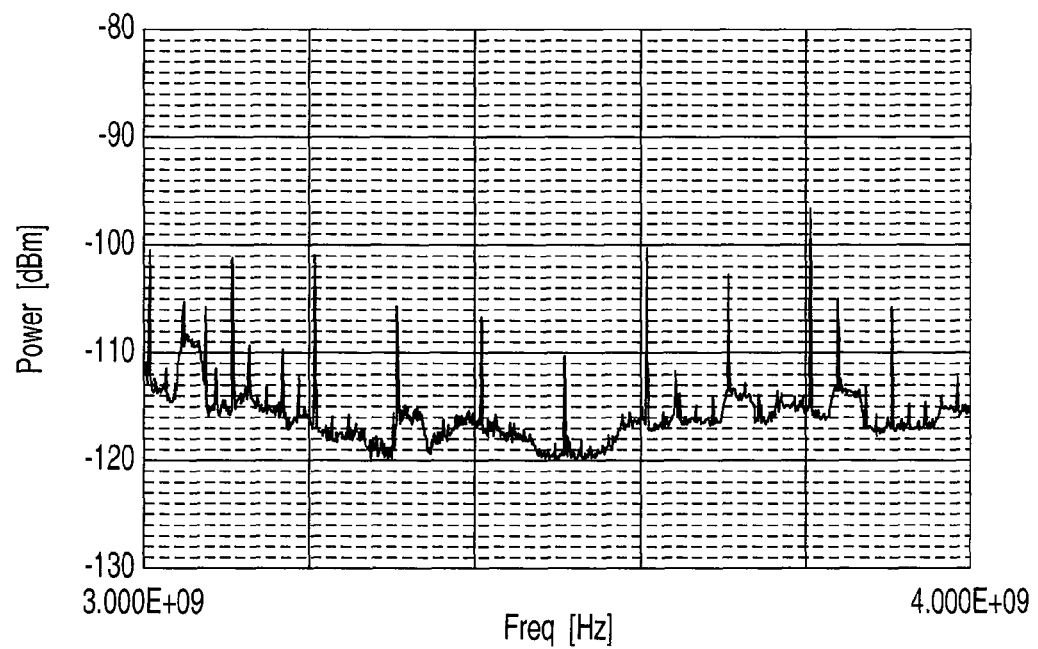
FIG. 2 shows a frequency characteristic actually measured near PC in a range of 3 GHz to 4 GHz by a spectrum analyzer.

Referring to FIG. 2, a signal near PC will be described as an example of the noise generated by the digital signal processing unit or electronic device. FIG. 2 shows the state of the signal near PC, which is actually measured in the range of 3 GHz to 4 GHz with a spectrum analyzer. As can be seen from FIG. 2, many signal-like noises are generated in the band. The noises such as a whisker-like signal in which the power is sharply projected at a certain frequency and a signal in which the power is projected into a trapezoidal shape over a certain frequency band are observed in FIG. 2.

Figure 3:
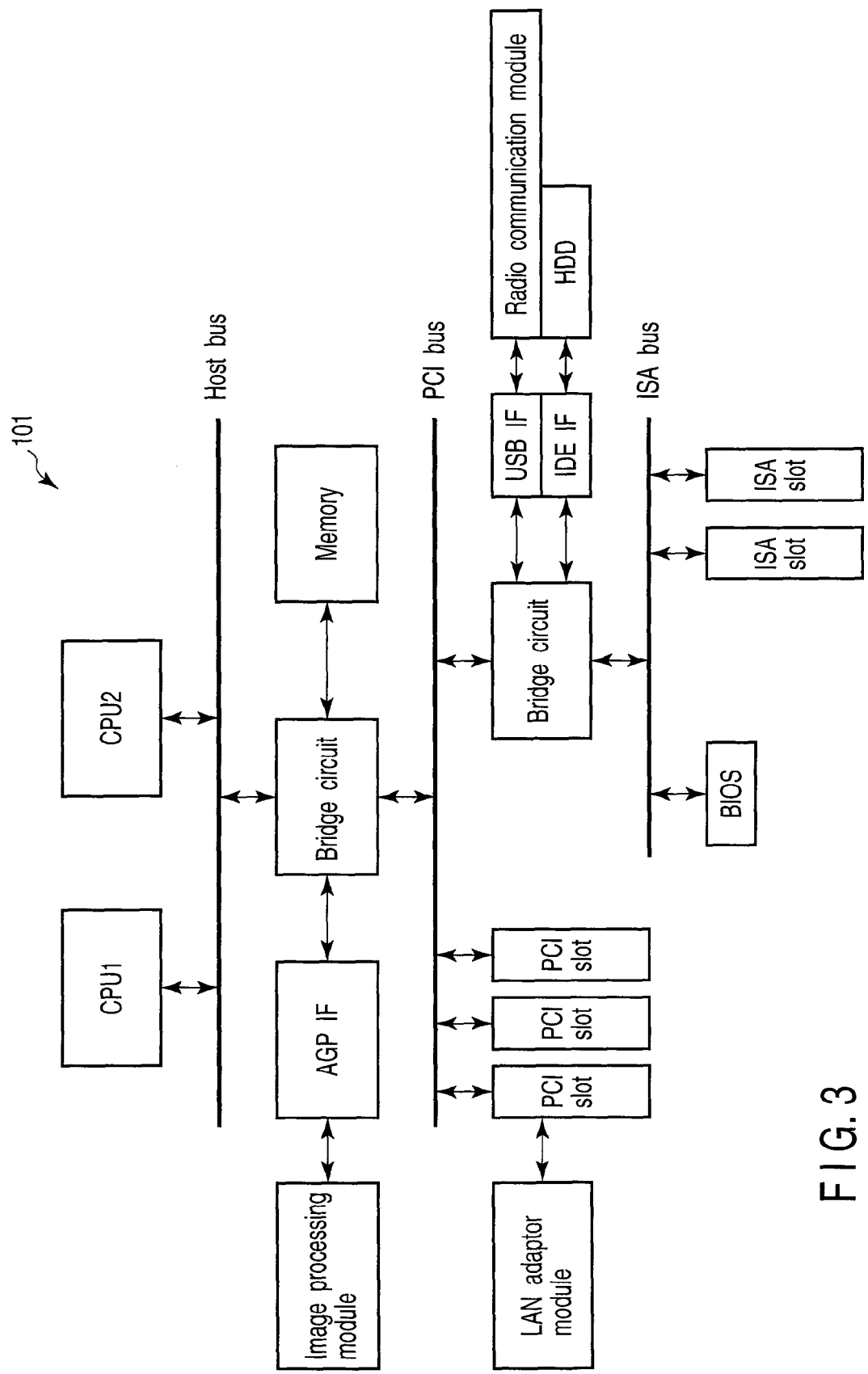
FIG. 3 is a block diagram showing a configuration of PC of FIG. 1.

A configuration of PC 101 will be described with reference to FIG. 3.

PC 101 includes external modules such as an image processing module, a Local Area Network (LAN) adaptor module, Hard Disk Drive (HDD), Basic Input Output System (BIOS), and a radio communication module. PC 101 includes CPU (for example, two CPUs 1 and 2), AGPIF, a bridge circuit, a memory, a PCI slot, and an ISA slot.

The external module is connected to each CPU and the memory through a host bus, a PCI bus, an Industrial Standard Architecture (ISA) bus, various Interface (IF) circuits, and a bridge circuit. Generally each module has an independent operating clock frequency.

An example of a frequency characteristic of the clock signal used in digital signal processing (for example, used in PC) will be described with reference to FIG. 4.

In the digital signal processing, generally the clock frequency is kept constant. In such cases, a strong clock noise is generated in a particular frequency. It is believed that the strong whisker-like signal observed in FIG. 2 is generated by a clock having a constant frequency.

Figure 4:
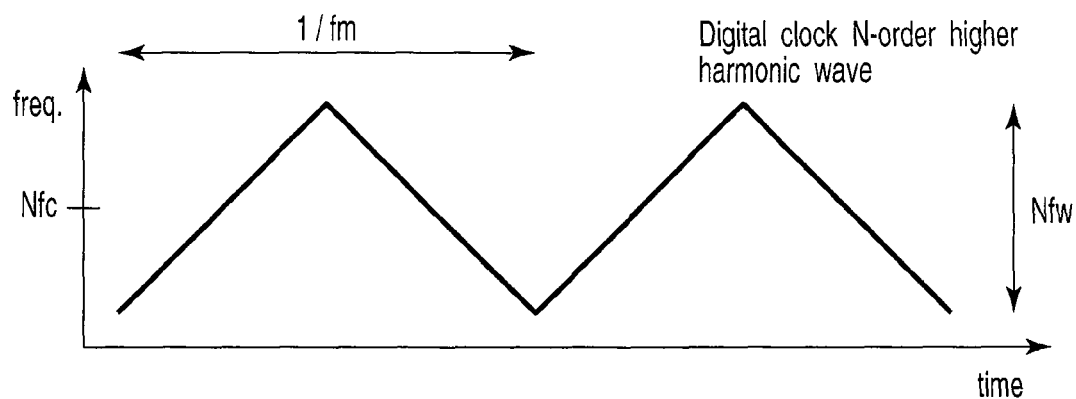
FIG. 4 shows a relationship between a time and a frequency of a clock signal which is SSC used in digital signal processing.

On the other hand, sometimes the clock frequency is spread by performing clock modulation in which the clock frequency is temporally moved as shown in FIG. 4 such that the strong noise signal is not generated at a certain frequency. This is called spread spectrum clock (SSC). The features of SSC can be expressed by three parameters, i.e., a center frequency fc, a frequency modulation width fw, and a modulation frequency fm. The center frequency fc is equal to the operating frequency of the clock. The frequency modulation width fw generally has megas hertz, and the modulation frequency fm has kilos hertz. The frequency modulation width fw and the modulation frequency fm depend on a spread scheme. As shown in FIG. 4, the parameters in an N-order (N is a natural number) high harmonic frequency at which the clock is generated are expressed by Nfc, Nfw, and fm respectively.

The frequency modulation width can be expressed by fw=0 in the clock to which SSC is not performed. A thin spectrum having a peak can be observed at the center frequency fc when the clock (fw=0) to which SSC is not performed is operated at the frequency fc. A spectrum having the frequency modulation width fw can be observed at the center frequency fc in the clock (fw=0) to which SSC is performed. These spectra become interference signals for the radio communication module and possibly deteriorate receiving performance of the radio communication module. The interference signal corresponding to the thin spectrum having the peak at the frequency fc is related to the whisker-like signal shown in FIG. 2, and the interference signal corresponding to the spectrum having the width fw is related to the trapezoidal signal shown in FIG. 2.

Figure 5:
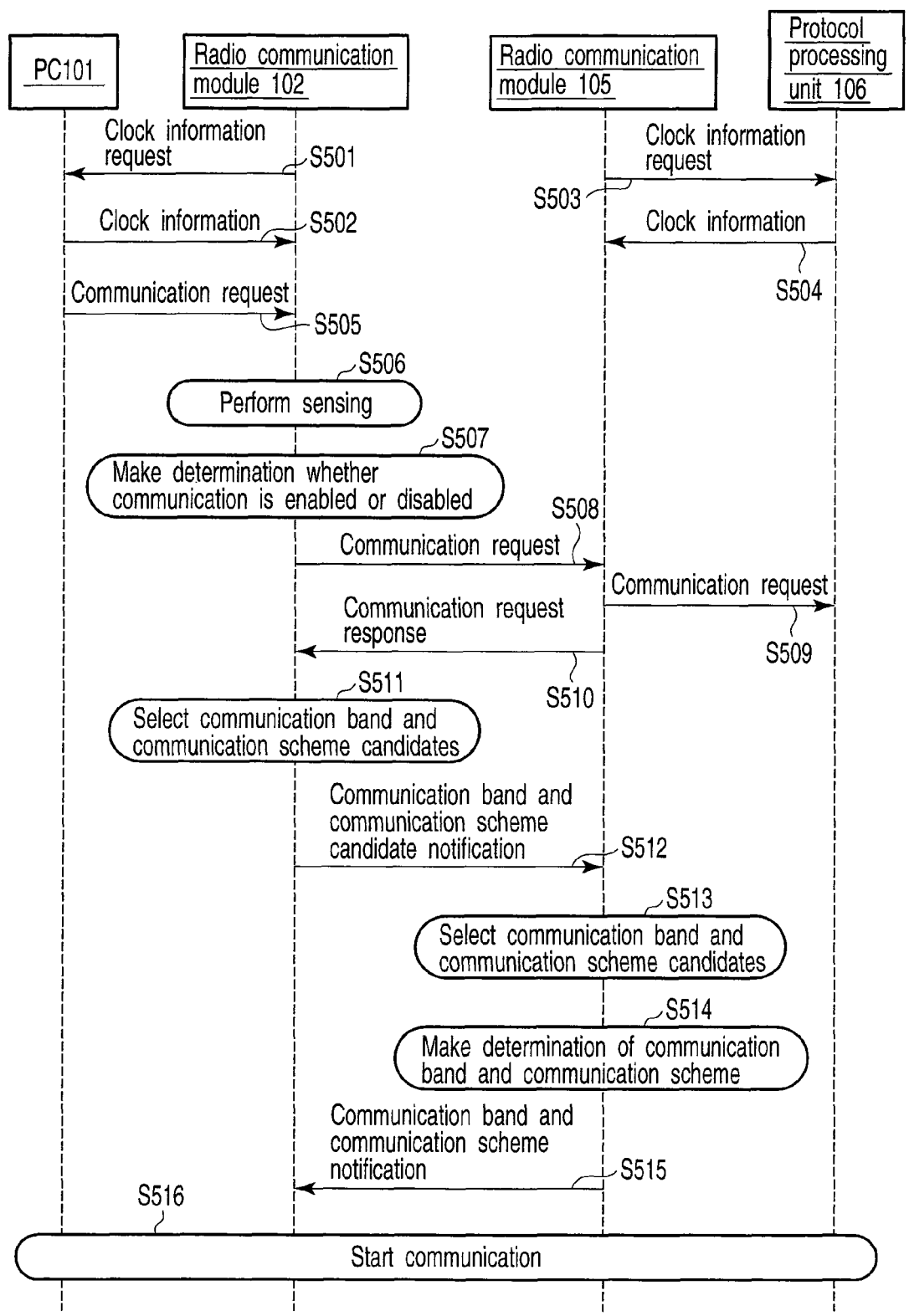
FIG. 5 is a flowchart showing processing performed in each radio communication apparatus and processing between the radio communication apparatus in the radio communication system.

Examples of the processing performed in each radio communication apparatus and the processing between the radio communication apparatus in the radio communication system of FIG. 1 will be described with reference to FIG. 5.

The data communication can be performed between PC 101 and the radio communication module 102 through USB IF, and the data communication can be performed between the radio communication module 105 and the protocol processing unit 106 through a dedicated IF. The radio communication module 102 and the radio communication module 105 are synchronized with each other using a synchronization signal. Using a control signal channel, a control signal can be transmitted and received at a low rate between the radio communication module 102 and the radio communication module 105 while interference with another communication system present in the neighborhood is kept at a minimum level.

Examples of the control signal include a communication start request signal, a data communication band notification signal, a data communication scheme notification signal, and a response notification signal. Examples of the method for performing communication at a low rate while the interference with another communication system present in the neighborhood is kept at a minimum level include a method for performing communication using a narrow frequency band dedicated to the control signal channel and a method for performing communication using the large spread like UWB.

The radio communication module 102 transmits a clock information request signal to PC 101 (Step S501). In response to the clock information request signal, PC 101 notifies the radio communication module 102 of clock information indicating fc, fw, and fm of the module performing the digital signal processing (Step S502). As shown in FIG. 3, many modules performing the digital signal processing are present in PC 101. A frequency generated by a quartz crystal is present in addition to the clock frequency generated in PLL (Phase Lock Loop). Therefore, there are plural sets of fc, fw, and fm of which PC 101 notifies the radio communication module 102 at Step S502.

Examples of the method for collecting fc, fw, and fm include a method in which each module notifies Operating System (OS) of frequency information through a driver to transmit the frequency information to the radio communication module connected through USB IF and a method in which BIOS collectively manages fc, fw, and fm of each module in starting up PC and transmits information on fc, fw, and fm to the radio communication module in response to the request from the radio communication module. In the module such as CPU in which the operating frequency is changed according to a processing amount, heat, and remaining battery power, even if the request is not made from the radio communication module 102, the side of PC 101 may become a master to notify the radio communication module 102 of fc, fw, and fm each time the operating frequency is changed.

On the other hand, the other radio communication apparatus performs the same processing (Steps S503 and S504). An example different from Steps S501 and S502 will be described below. When the radio communication module 105 notifies the protocol processing unit 106 of the clock information request signal (Step S503), and when the protocol processing unit 106 notifies the radio communication module 105 of only the center frequency fc of the operating frequency (Step S504), the radio communication module performs sensing to estimate fw and fm while the data communication is not performed. The estimation of fw and fm can be performed by power analysis having frequency resolution finer than that of fw in a period shorter than 1/(2×fm). These pieces of processing may be performed in Steps S501 and S502.

The radio communication module may possess information on fc, fw, and fm concerning the clock of the digital signal processing unit included in the radio communication module of itself. Thus, the radio communication module possesses the information on fc, fw, and fm concerning each of the clock group which the modules use for the digital signal processing.

Figure 7:
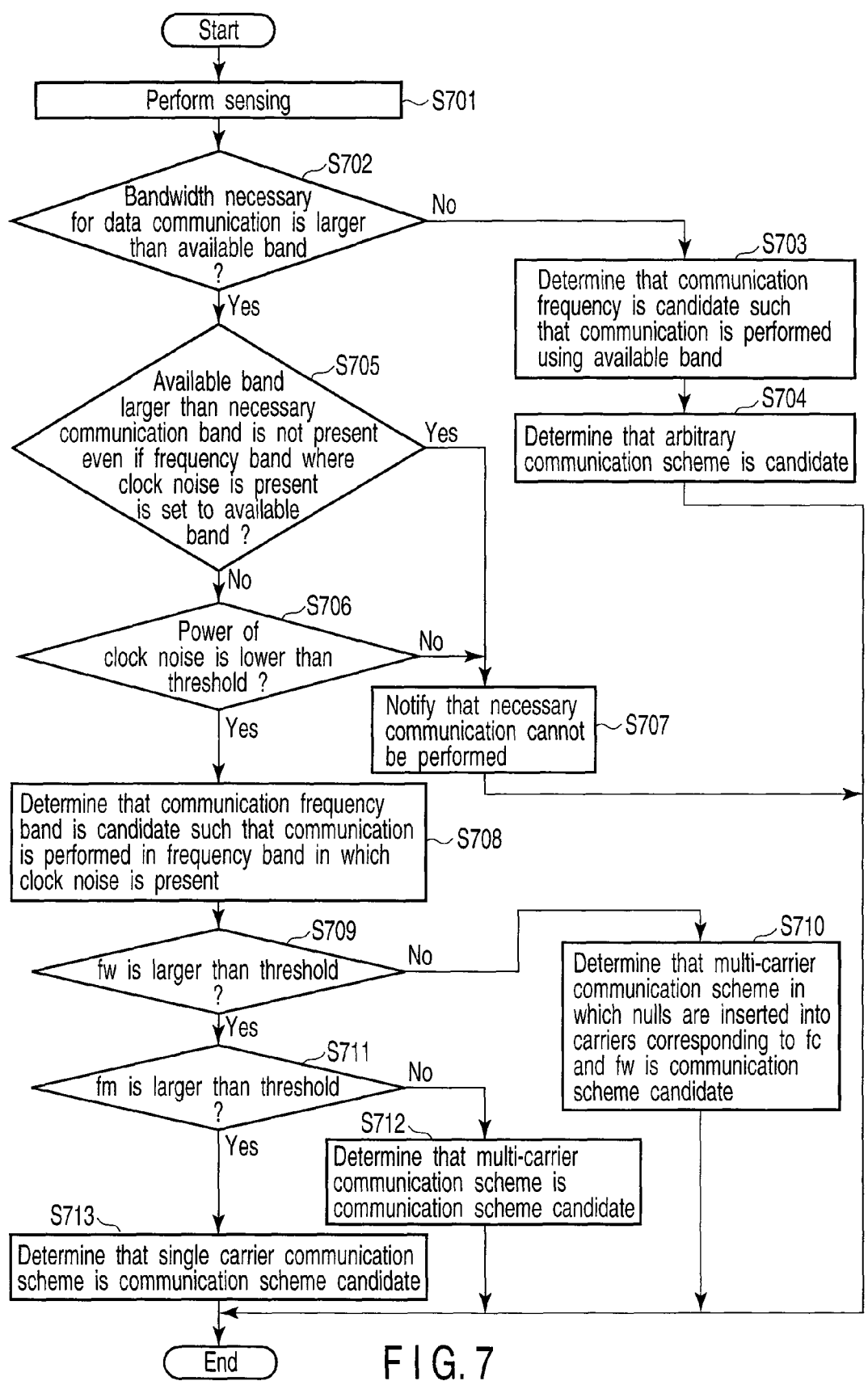
FIG. 7 is a flowchart showing an operation performed by a communication scheme and communication frequency selection processing unit of FIG. 6.

When the radio communication apparatus including PC 101 performs communication with the radio communication apparatus including the access point 107, PC 101 notifies the radio communication module 102 of the communication request signal (Step S505). The radio communication module 102 receiving the communication request performs sensing in the frequency band (main band) which becomes a communication candidate (Step S506). At this point, for example, the main band is 1 GHz, and the sensing has the frequency resolution of 1 MHz. In the sensing, receiving signal power is measured in each frequency to investigate the clock noise generated by the clock. Using the sensing result and the clock information, the radio communication module 102 determines whether the communication is enabled or disabled (Step S507). The determination will be described later with reference to FIG. 7. It is assumed that the radio communication module 102 determines that the communication is enabled. When the radio communication module 102 determines that the communication is disabled, the radio communication module 102 notifies the other radio communication apparatus of a communication disable notification signal, and the radio communication module 102 performs the processing such that the communication is performed in a different frequency band.

When the radio communication module 102 determines that the communication is enabled in Step S507, the radio communication module 102 notifies the radio communication module 105 of the communication request signal using the control signal channel (Step S508). The radio communication module 105 receives the communication request signal, and the radio communication module 105 notifies the protocol processing unit 106 that the radio communication module 105 has received the communication request signal from PC 101 (Step S509). The radio communication module 105 notifies the radio communication module 102 that the radio communication module 105 has received the communication request signal by sending a communication request response signal to the radio communication module 102 through the control signal channel (Step S510). The radio communication module 102 receives the communication request response signal to perform processing for selecting the communication band and communication scheme candidates (Step S511). The communication band and communication scheme candidate selection processing will be described later with reference to FIG. 7. As used herein, the communication band shall mean a frequency band in which data signal communication is performed, and the communication scheme shall mean a communication scheme for performing the data signal communication. In a communication frequency band in which the data signal communication is performed, it is necessary to enhance a transmission rate unlike the control signal communication. Therefore, because generally the communication with the high power is required in the wide band, there is a high risk of the interference with other systems. Accordingly, in the communication frequency band, it is necessary that an available band be selected more carefully than the control signal channel. In the communication scheme, single carrier communication and multi-carrier communication are distinguished from each other, and the modulation scheme (such as QPSK and 16QAM) is selected.

As used herein, the multi-carrier communication shall mean a communication scheme in which carriers are arranged at frequencies such as a communication scheme in which an orthogonal frequency is used like OFDM and a scheme in which the frequency is multiplexed in the single carrier communication. When the communication performed between the radio communication module 102 and the radio communication module 105 is Frequency Division Duplex (FDD), the communication band and communication scheme candidates are selected.

The radio communication module 102 notifies the radio communication module 105 of the communication band and communication scheme candidates selected by the radio communication module 102 through the control channel (Step S512). Similarly to the radio communication module 102, the radio communication module 105 selects the communication band and communication scheme candidates (Step S513). The radio communication module 105 compares the communication band and communication scheme candidates selected by the radio communication module 105 with the communication band and communication scheme candidates selected by the radio communication module 102, and the radio communication module 105 makes a determination of the communication band and communication scheme (Step S514). In the case of Time Division Duplex (TDD), the radio communication module 105 performs only the sensing to investigate whether or not the communication band is available in Step S513, and the radio communication module 105 makes the determination of the communication band in Step S514 when the communication band is available.

The radio communication module 105 notifies radio communication module 102 of the determined communication band and communication scheme through the control channel (Step S515), and the data communication between the radio communication apparatus is started using the determined communication band and communication scheme (Step S516).

The radio communication modules 102 and 105 of FIG. 1 will be described with reference to FIG. 6. In FIG. 6, the radio communication modules 102 and 105 are connected to the host using USB IF 601. PCI IF is used in the case where the radio communication modules 102 and 105 are connected to the host through the PCI bus. The dedicated IF may be used in the case where radio communication module 105 is directly connected to upper layer processing.

The radio communication modules 102 and 105 have the configurations shown in FIG. 6.

USB IF 601 performs communication with an MAC processing unit 602. In addition to the transmitted and received data signals, contents of the communication include the information on fc, fw, and fm concerning the clock of the digital signal processing unit used on the PC side and control signals such as the communication start request signal, and a data rate specification signal.

The MAC processing unit 602 adjusts the data rate. The MAC processing unit 602 supplies information to a communication scheme and communication frequency selection processing unit 619 and a sensing frequency selection processing unit 621. The MAC processing unit 602 stores the results transmitted from the communication scheme and communication frequency selection processing unit 619 and sensing frequency selection processing unit 621, and the MAC processing unit 602 stores fc, fw, and fm transmitted from the PC side. The MAC processing unit 602 also performs data error check and re-transmission control.

The communication data supplied from the MAC processing unit 602 is delivered from the antenna 622 through an error correction coding processing unit 603, a modulation processing unit 604, a mapping processing unit 605, a frequency conversion processing unit 606, an up-sample processing unit 607, Low-Pass Filter (LPF) 608, and an intermediate frequency and radio frequency (IF/RF) circuit 609.

The error correction coding processing unit 603 performs interleaving after coding processing, thereby randomizing data arrangement.

The modulation processing unit 604 modulates the data randomized by the error correction coding processing unit 603.

The mapping processing unit 605 performs mapping of data and a pilot signal according to a predetermined format. In the case where the multi-carrier communication is performed, the mapping processing unit 605 determines which frequency is allocated to the modulated data.

The frequency conversion processing unit 606 switches the carrier frequency to an arbitrary frequency in the main band according to an instruction of the communication scheme and communication frequency selection processing unit 619. In the case where the multi-carrier communication with OFDM is selected, the frequency conversion processing unit 606 performs Inversed Discrete Fourier Transform (IDFT) processing and guard interval addition processing.

Because the up-sample processing unit 607, LPF 608, and the IF/RF circuit 609 are operated in the same manner as the conventional radio communication apparatus, the description is omitted.

In the signal received from the antenna 622, the MAC processing unit 602 is notified of the receiving data through an intermediate frequency and radio frequency circuit 610, LPF 611, a synchronization processing unit 612, a down-sample processing unit 613, a frequency conversion processing unit 614, a demapping processing unit 615, a channel response estimation processing unit 617, a demodulation processing unit 616, and an error correction decoding processing unit 618.

The frequency conversion processing unit 614 converts a data communication carrier present in the main band into a base band signal according to an instruction of the communication scheme and communication frequency selection processing unit 619. In the case where the multi-carrier communication is being performed with OFDM, the frequency conversion processing unit 614 performs a guard interval removal processing and Discrete Fourier Transform (DFT) processing.

The demapping processing unit 615 divides the data and the pilot signal according to a predetermined frame format.

The error correction decoding processing unit 618 performs reversal processing of the interleaving performed in the transmission system before error correction decoding is performed, thereby returning the data arrangement to the original order.

The communication scheme and communication frequency selection processing unit 619 sets parameters in the pieces of processing from the error correction coding processing unit 603 to the error correction decoding processing unit 618 in the transmission system and receiving system. Each unit is operated according to the setting parameter. Examples of the setting parameter include a kind of error correction code, a coding ratio, and a interleaving length for the error correction coding processing unit 603 and error correction decoding processing unit 618, a modulation scheme for the modulation processing unit 604, demodulation processing unit 616, and channel response estimation processing unit 617, a carrier frequency, distinction between the single carrier and the multi-carrier, and the number of sub-carriers for the mapping processing unit 605, frequency conversion processing units 606 and 614, demapping processing unit 615, and synchronization processing unit 612, a symbol rate for the up-sample processing unit 607 and down-sample processing unit 613, a base band signal bandwidth for LPFs 608 and 611, and the center frequency of the main band for the IF/RF circuits 609 and 610.

The communication scheme and communication frequency selection processing unit 619 selects the data rate used in the data communication requested from PC, and the information on fc, fw, and fm received from PC. The communication scheme and communication frequency selection processing unit 619 selects the candidates of the kind of error correction code, the coding ratio, the interleaving length, the modulation scheme, the carrier frequency, the distinction between the single carrier and the multi-carrier, the number of sub-carriers, the symbol rate, the base band signal bandwidth, and the center frequency of the main band according to the result of the sensing processing. Using the communication scheme and communication frequency candidates from the other side of the communication, the communication scheme and communication frequency selection processing unit 619 determines these parameters to set the parameters for the pieces of processing. The method for determining the parameter will be described later with reference to FIG. 7.

The sensing processing unit 620 measures the power in each frequency from the signal in the main band. The sensing processing unit 620 measures the power in each frequency while dividing the main band into fine grids according to an instruction of the sensing frequency selection processing unit 621, and the sensing processing unit 620 sends back the collected power data to the sensing frequency selection processing unit 621.

The sensing frequency selection processing unit 621 controls sensing timing of the sensing processing unit 620 in cooperation with the MAC processing unit 602, and the sensing frequency selection processing unit 621 stores the sensing result.

The selection of the communication scheme and communication frequency, performed by the communication scheme and communication frequency selection processing unit 619 of FIG. 6, will be described below with reference to FIGS. 7 to 14. The selected communication scheme and communication frequency are the data transfer channel (channel through which the communication is started in Step S516). It is assumed that the communication request in Step S508, the communication request response in Step S510, the communication band and communication scheme candidate notification in Step S512, and the communication band and communication scheme notification in Step S515 are already determined. It is also assumed that the parameters of fc, fm, and fw of each digital signal processing module are received from PC 101. The selected communication frequency is the parameter set to the frequency conversion processing units 606 and 614. The selected communication scheme is the distinction between the single carrier and the multi-carrier, and the selected communication scheme is set to the mapping processing unit 605, frequency conversion processing units 606 and 614, and demapping processing unit 615.

The determination whether the communication is enabled or disabled and the method for determining the frequency band candidate in which the communication is performed will be described. When having received the communication request from PC 101, the radio communication module 102 starts the sensing in the main band to know the usage of the frequency (Step S701). As a result of the sensing, the radio communication module 102 determines that the frequency band whose power is lower than a threshold Pth is the available band.

FIG. 8 shows an example of the sensing result. Referring to FIG. 8, because only the power lower than a threshold Pth is detected in other portions in the main band although the signal having the peak is present near the center of the main band, the available band occupies the large portion of the main band.

The radio communication module 102 determines whether or not the communication bandwidth necessary for the data communication computed by the communication amount requested from PC 101 can be ensured from the result of the sensing in Step S701 (Step S702). When the bandwidth necessary for the data communication is smaller than the available band (NO in Step S702), the radio communication module 102 determines that the communication frequency is the candidate such that the communication is performed using the available band as shown in FIG. 9 (Step S703). At this point, a priority to the frequency band N×fc delivered from PC 101 is decreased in selecting the frequency band used in the data communication. The priority represents a degree for selecting a natural number times a center frequency of a clock frequency. As to the communication scheme, the radio communication module 102 determines that an arbitrary communication scheme is the candidate (Step S704).

On the other hand, as shown in FIG. 10, when the bandwidth necessary for the data communication is larger than the available band (YES in Step S702), the radio communication module 102 distinguishes between the clock noise signal and other interference signals based on the data fc received from PC 101.

When the data concerning the three clock noises (fc1, fw1, and fm1), (fc2, fw2, and fm2), and (fc3, fw3, and fm3) is received from PC 101 as shown in FIG. 10, a signal 1001 present at a frequency N×fc1, a signal 1002 present at a frequency M×fc2, and a signal 1003 present at a frequency fc3 are quite likely to be the clock noise (N and M are natural numbers). Because of no pieces of information on a signal 1004, the signal is possibly the interference signal from another system. In the frequency band in which only the clock noise is present while the interference signal cannot be detected from another system, it is believed that a possibility of affecting another system is sufficiently low. Therefore, it is believed that the frequency band in which only the clock noise is present can be utilized in the data communication. The radio communication module 102 compares the necessary communication bandwidth with the available band of the case in which the band in which the clock noise is present is used as the available band, i.e., the case in which the signal 1001 present at the frequency N×fc1, the signal 1002 present at the frequency M×fc2, and the signal 1003 present at the frequency fc3 are not detected (Step S705). When the available band is smaller than the necessary communication band even if the band in which the clock noise is present is set to the available band (NO in Step S705), or when the power of the clock noise cannot ensure SIR necessary to perform communication in the frequency band even if the available band is present (NO in Step S706), the radio communication module 102 determines that the necessary communication cannot be performed and notifies PC 101 that the necessary communication cannot be performed (Step S707), and the radio communication module 102 waits for the new communication request. In Step S706, the radio communication module 102 compares the power of the clock noise with a threshold. The threshold differs from the threshold Pth in Steps S701 and S702, and the threshold is determined by a distance between the radio communication apparatus, the transmission power of the radio communication apparatus of the other side, and throughput required between the radio communication apparatus.

In the case where the band in which the clock noise is present is set to the available band, when the necessary communication band is smaller than the available band (YES in Step S705), and when the power of the clock noise can ensure SIR necessary to perform communication in the frequency band (YES in Step S706), the radio communication module 102 determines that the necessary communication is enabled, and the radio communication module 102 determines the communication frequency candidate such that the data communication is performed in the frequency band in which the clock noise is present (Step S708). FIG. 11 shows the case in which the data communication is performed at fc3.

The method for determining the communication scheme in the case in which the communication is performed in the frequency band where the clock noise is present will be described below. It is assumed that the data communication is performed at the frequency fc3 as shown in FIG. 11. At this point, it is assumed that fw3 is the frequency modulation width fw corresponding to fc3. The frequency modulation width fw corresponding to the N×fc1 becomes N×fw1. When fw3 is smaller than a threshold Fth1 (NO in Step S709), a multi-carrier communication scheme in which null is inserted into fc3 and fw3 as shown in FIG. 12 is set to the communication scheme candidate (Step S710). The position where the null sub-carrier is inserted is the frequency corresponding to the frequency fc3, and the number of null sub-carriers is determined according to the width of the bandwidth fw3. That is, the frequency width into which the null sub-carrier is inserted is formed larger than fw3. At this point, the threshold Fth1 is determined in proportion to the communication frequency bandwidth. For example, a half of the communication frequency bandwidth is set to the threshold Fth1. The threshold Fth1 is set smaller than the necessary communication frequency bandwidth.

When fw3 is larger than the threshold Fth1 (YES in Step S709), the radio communication module 102 makes a determination of fm (Step S711). At this point, the modulation frequency fm corresponding to fc3 is set to fm3. The modulation frequency fm corresponding to N×fc1 does not become N×fm1, but become fm1. When fm3 is smaller than the threshold Fth2 (NO in Step S711), the radio communication module 102 determines that the multi-carrier communication scheme is the communication scheme candidate as shown in FIG. 13 (Step S712). At this point, the null sub-carrier is not set unlike Step S710. When fm3 is larger than the threshold Fth2 (YES in Step S711), the radio communication module 102 determines that the single carrier communication scheme is the communication scheme candidates as shown in FIG. 14 (Step S713). The threshold Fth2 is set larger when the symbol length is increased, and the threshold Fth2 is set smaller when the symbol length is decreased. The symbol length is proportional to an inverse number of the communication frequency bandwidth. That is, the threshold Fth2 is determined in proportion to the necessary communication frequency.

Alternatively, in the case where the clock noise is generated, the decrease in error rate may be prevented by changing the error correction code to a code having higher correction performance, by lowering the coding ratio, or by changing the modulation scheme to a modulation scheme having the lower error rate according to the number of clock noises fc present in the data communication band. A probability of continuously generating the errors may be lowered to prevent a decrease in packet error rate by increasing or decreasing the interleaving length in proportion to fm.

Even if the sufficiently available frequency band is present like Step S703, the communication is performed in the frequency band avoiding the registered operating clock frequency fc. Therefore, when an operation of a certain digital signal processing module is started to generate the interference during the communication, a time necessary to change the communication frequency can be shortened to improve the throughput of the communication.

In the case where the data communication is performed in the frequency band where the clock noise is present while fw is smaller than the threshold Fth1 like Step S710, the multi-carrier communication into which null is previously inserted is performed in consideration of the registered operating clock frequency fc and frequency modulation width fm of SSC. Therefore, the sub-carrier affected by the interference is not used, so that the error rate can be enhanced to improve the throughput of the communication.

Like Step S712, in the case where the data communication is performed in the frequency band where the clock noise is present, when fw is larger than the threshold Fth1, and when fm is smaller than the threshold Fth2, because only a part of the sub-carriers is affected by the interference by performing the multi-carrier communication, the error can be corrected by the error correction code. Therefore, the packet error rate can be lowered to improve the throughput of the communication.

Like Step S713, in the case where the data communication is performed in the frequency band where the clock noise is present, when fw is larger than the threshold Fth1, and when fm is larger than the threshold Fth2, because only a part of the symbol length is affected by the interference by performing the single-carrier communication, the error can be corrected by the error correction code. Therefore, the packet error rate can be lowered to improve the throughput of the communication.

Thus, in the embodiment, the communication frequency, the communication scheme, and the signal power are determined according to the characteristic of the noise generated in the digital signal processing unit. Therefore, the communication scheme robust to the interference can be selected, so that the error rate of the radio communication can be lowered to improve the throughput of the communication in the radio communication system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus connected to a device including a digital signal processing unit generating a clock signal, the radio communication apparatus comprising:

an acquisition unit configured to acquire frequency information concerning the clock signal from the digital signal processing unit;

a first measurement unit configured to measure a signal power in a first frequency band;

a comparison unit configured to compare the signal power with a threshold;

a first selection unit configured to select, from the first frequency band, a second frequency band necessary for data communication, a bandwidth of the first frequency band whose signal power is lower than the threshold being more than a bandwidth of the second frequency band;
a second selection unit configured to select a first communication scheme from a plurality of communication schemes of the data communication according to the frequency information; and
a communication unit configured to use the first communication scheme to perform the data communication in the second frequency band,
wherein the second selection unit inserts a null signal into a sub-carrier corresponding to a width N times a frequency modulation width of clock modulation around a frequency N (N is a natural number) times a center frequency of the clock signal, when the data communication is performed using a frequency band which include N times the center frequency and when the width N times corresponding to the center frequency is equal to or less than a width threshold.

2. The apparatus according to claim 1, wherein the width threshold is proportional to a width of the second frequency band.

3. A radio communication apparatus connected to a device including a digital signal processing unit generating a clock signal, the radio communication apparatus comprising:
an acquisition unit configured to acquire frequency information concerning the clock signal from the digital signal processing unit;
a first measurement unit configured to measure a signal power in a first frequency band;
a comparison unit configured to compare the signal power with a threshold;
a first selection unit configured to select, from the first frequency band, a second frequency band necessary for data communication, a bandwidth of the first frequency band whose signal power is lower than the threshold being more than a bandwidth of the second frequency band;
a second selection unit configured to select a first communication scheme from a plurality of communication schemes of the data communication according to the frequency information; and
a communication unit configured to use the first communication scheme to perform the data communication in the second frequency band,
wherein the second selection unit selects a multi-carrier communication scheme, when the data communication is performed using a frequency band which include N (N is a natural number) times the center frequency, when a width N times a frequency modulation width of clock modulation corresponding to the center frequency is more than a width threshold, and when a modulation frequency of the clock modulation corresponding to the center frequency is equal to or less than a modulation threshold.

4. The apparatus according to claim 3, wherein the modulation threshold is inversely proportional to a width of the third frequency band and the width threshold is proportional to the width of the third frequency band.

5. A radio communication apparatus connected to a device including a digital signal processing unit generating a clock signal, the radio communication apparatus comprising:
an acquisition unit configured to acquire frequency information concerning the clock signal from the digital signal processing unit;
a first measurement unit configured to measure a signal power in a first frequency band;
a comparison unit configured to compare the signal power with a threshold;
a first selection unit configured to select, from the first frequency band, a second frequency band necessary for data communication, a bandwidth of the first frequency band whose signal power is lower than the threshold being more than a bandwidth of the second frequency band;
a second selection unit configured to select a first communication scheme from a plurality of communication schemes of the data communication according to the frequency information; and
a communication unit configured to use the first communication scheme to perform the data communication in the second frequency band,
wherein the second selection unit selects a single carrier communication scheme, when the data communication is performed using a frequency band which include N (N is a natural number) times the center frequency, when a width N times a frequency modulation width of clock modulation corresponding to the center frequency is more than a width threshold, and when a modulation frequency of the clock modulation corresponding to the center frequency is more than a modulation threshold.

6. The apparatus according to claim 5, wherein the modulation threshold is inversely proportional to a width of the third frequency band and the width threshold is proportional to the width of the third frequency band.

* * * * *